(12) United States Patent
Miller

(10) Patent No.: US 12,435,745 B1
(45) Date of Patent: Oct. 7, 2025

(54) LOCK MECHANISM OPERABLE TO LOCK AN ADJUSTED LENGTH OF TELESCOPICALLY ATTACHED RODS

(71) Applicant: Greg A. Miller, Saint Peters, MO (US)

(72) Inventor: Greg A. Miller, Saint Peters, MO (US)

( * ) Notice: Subject to any disclaimer, the term of this patent is extended or adjusted under 35 U.S.C. 154(b) by 0 days.

(21) Appl. No.: 19/038,970

(22) Filed: Jan. 28, 2025

Related U.S. Application Data

(60) Provisional application No. 63/732,762, filed on Sep. 20, 2024.

(51) Int. Cl.
*F16B 7/14* (2006.01)
*F16G 11/10* (2006.01)

(52) U.S. Cl.
CPC .............. *F16B 7/14* (2013.01); *F16G 11/10* (2013.01)

(58) Field of Classification Search
CPC ........ F16B 7/04; F16B 7/0406; F16B 7/0426; F16B 7/10; F16B 7/14; F16B 7/1418; F16B 7/1454; F16B 7/1481; F16B 2/245; F16B 2/246
See application file for complete search history.

(56) References Cited

U.S. PATENT DOCUMENTS

| | | | | |
|---|---|---|---|---|
| 836,303 A * | 11/1906 | Christensen | ............ | E21B 19/10 |
| | | | | 126/30 |
| 4,558,893 A * | 12/1985 | Shelly | ............ | F21V 21/22 |
| | | | | 248/161 |
| 4,928,916 A * | 5/1990 | Molloy | ............ | E04F 21/1805 |
| | | | | 248/354.1 |
| 5,595,410 A * | 1/1997 | Wilson | ............ | F16B 2/246 |
| | | | | 292/259 R |
| 6,179,514 B1 * | 1/2001 | Cheng | ............ | F16L 37/08 |
| | | | | 285/902 |
| 6,869,112 B2 * | 3/2005 | Guidetti | ............ | F16B 2/246 |
| | | | | 292/306 |
| 7,222,892 B2 * | 5/2007 | Guidetti | ............ | F16B 2/246 |
| | | | | 292/306 |

(Continued)

FOREIGN PATENT DOCUMENTS

| CA | 2772052 A1 * | 9/2013 | ............ F16L 3/20 |
|---|---|---|---|
| CA | 2890389 A1 * | 11/2015 | |

(Continued)

*Primary Examiner* — Jonathan P Masinick
(74) *Attorney, Agent, or Firm* — Sandberg Phoenix & von Gontard, P.C.

(57) ABSTRACT

A lock mechanism operable to lock an adjusted length of telescopically attached rods includes a housing having an interior bore with a first annular surface and second annular surface in the interior bore. The first and second annular surfaces are beveled surfaces. At least one lock key having a ring portion is positioned in the interior bore between the beveled surfaces. The first rod extends into one end of the housing and through the ring portion of the lock key and the second rod extends into an opposite end of the housing. The first and second rods are telescopically engaged inside the housing. When the ring portion of the lock key engages against one of the annular surfaces, the ring portion engages against the first rod and locks the first rod relative to the annular surface and the housing and relative to the second rod. Moving the ring portion of the lock key away from the annular surface frees the first and second rods form the lock mechanism enabling their adjustment.

20 Claims, 6 Drawing Sheets

(56) References Cited

U.S. PATENT DOCUMENTS

| | | | | |
|---|---|---|---|---|
| 9,095,216 | B2* | 8/2015 | Miller | A47C 4/46 |
| 9,145,733 | B2* | 9/2015 | Worthington | E06C 7/423 |
| 9,267,519 | B2* | 2/2016 | Bus | E06C 7/44 |
| 9,301,616 | B2* | 4/2016 | Miller | A47C 7/008 |
| 9,347,472 | B2* | 5/2016 | Lambertson, Jr. | B25G 1/102 |
| 9,512,865 | B2* | 12/2016 | Wang | A47G 25/06 |
| 9,890,898 | B2* | 2/2018 | Christensen | F16M 11/26 |
| 10,774,552 | B2* | 9/2020 | Klein | E04F 21/1833 |
| 11,071,362 | B2* | 7/2021 | Lai | A45B 9/04 |
| 2012/0205510 | A1* | 8/2012 | Fortier | F16M 11/18 |
| | | | | 248/423 |

FOREIGN PATENT DOCUMENTS

| | | | | |
|---|---|---|---|---|
| EP | 2213885 A1 | * | 8/2010 | F16M 11/32 |
| GB | 2365761 A | * | 2/2002 | A47C 3/40 |
| KR | 20110000761 U | * | 1/2011 | A47G 25/0664 |
| KR | 200473646 Y1 | * | 7/2014 | F16B 7/14 |

* cited by examiner

LOCK MECHANISM OPERABLE TO LOCK AN ADJUSTED LENGTH OF TELESCOPICALLY ATTACHED RODS

CROSS REFERENCE TO RELATED APPLICATIONS

This patent application claims the benefit of the filing date of provisional patent application Ser. No. 63/732,762, which was filed on Sep. 20, 2024.

BACKGROUND OF THE INVENTION

There are many applications in which adjustable length rods or adjustable length poles are used. For example, adjustable length rods are used to support cleaning tools such as window squeegees, dusting heads, and brushes where an adjustable length rod is needed to access high locations. Additionally, adjustable length rods are used to provide tools such as mops, brooms, rakes, retrieving tools etc. with adjustable lengths that can be shortened for tool storage and extended for tool use. Adjustable length rods are also used in applications other than tools such as tent poles, partition poles, flag poles, as parts of lawn furniture and children's play structures, etc.

Many of these types of adjustable length rods are disadvantaged in that their adjustment features or locking mechanisms are difficult to operate or do not operate efficiently.

For example, some adjustable length rods have locking mechanisms that comprise mating screw threads on adjacent rod sections. The adjacent rod sections must be twisted or turned relative to each other many times to adjust the length of the adjustable length rods.

Some adjustable length rods have locking mechanisms that comprise spring biased pins on one rod that engage in one of a plurality of linearly spaced holes in a second telescopically attached rod. To lock the length of the rods, the rods are moved telescopically relative to each other and the pin is be aligned with one of the plurality of holes to lock the rods at an adjusted length of the rods.

Many lock mechanisms are not only difficult to operate, but when used on rods that are exposed to the environment in use, the lock mechanisms can deteriorate and corrode, negating the operation of the lock mechanism.

SUMMARY OF THE INVENTION

The lock mechanism of this disclosure has a construction that can be easily added to an end of one rod of a pair of telescopically engaged rods. The lock mechanism is easily manually operated to enable the length of the telescopically engaged rods to be adjusted and then lock the rods at the adjusted length.

The lock mechanism has a housing with an exterior surface configuration that can be easily gripped by one hand of a user of the lock mechanism. The housing has a length between a first end surface of the housing and a second end surface of the housing. An interior bore extends through the length of the housing from the first end surface of the housing to the second end surface of the housing. The interior bore has a cylindrical interior configuration with a center axis that defines mutually perpendicular axial and radial directions relative to the housing.

There is a first annular surface inside the housing. The first annular surface is a planar surface that extends around the interior bore and the center axis and is positioned in a beveled plane relative to the center axis.

There is also a second annular surface inside the housing spaced axially from the first annular surface. The second annular surface is also a planar surface that extends around the interior bore and the center axis and is positioned in a beveled plane relative to the center axis.

A lock key is positioned in the interior bore of the housing between the first annular surface and the second annular surface. The lock key has a ring portion that extends around the interior bore and around the center axis.

A first rod of a pair of first and second telescopically engaged rods extends through the interior bore of the housing and through the ring portion of the lock key. The first rod is dimensioned to be adjustably movable through the interior bore of the housing, through the first annular surface in the interior bore of the housing and through the ring portion of the lock key.

A second rod of the pair of first and second telescopically engaged rods extends into the interior bore of the housing. The second rod is secured to the interior bore and to the housing with an end of the second rod adjacent the second annular surface inside the interior bore of the housing. The second rod is dimensioned to receive the first rod inside the second rod in telescoping engagement of the rods enabling the first rod to be adjustably moved in reciprocating movements through the second rod.

A spring is positioned in the interior bore of the housing between the first annular surface and the second annular surface. The spring is dimensioned to enable the first rod to extend through the spring. The spring is also dimensioned to engage against the ring portion of the lock key and urge the lock key toward the first annular surface.

The ring portion of the lock key is configured to be moveable through the interior bore of the housing by a force of the spring toward the first annular surface. When the ring portion of the lock key engages against the first annular surface, the ring portion is positioned at the angle of the first annular surface and also engages against the exterior surface of the length of the first rod extending through the interior bore and through the ring portion. The engagement of the ring portion on the first rod prevents movement of the first rod relative to the housing. The ring portion is also configured to be movable in the interior bore against the force of the spring away from the first annular surface where the ring portion disengages from the exterior surface of the first rod. The disengagement of the ring portion from the first rod enables movement of the first rod through the interior bore relative to the housing and enables adjusting telescopic movements of the first rod into and out of the second rod.

BRIEF DESCRIPTION OF DRAWINGS

Further objects and features of the lock mechanism and the telescopically adjustable length rods of this disclosure are set forth in the following detailed description of the lock mechanism and rods and the drawing figures.

DETAILED DESCRIPTION OF THE INVENTION

Figures 1, 2, 3:
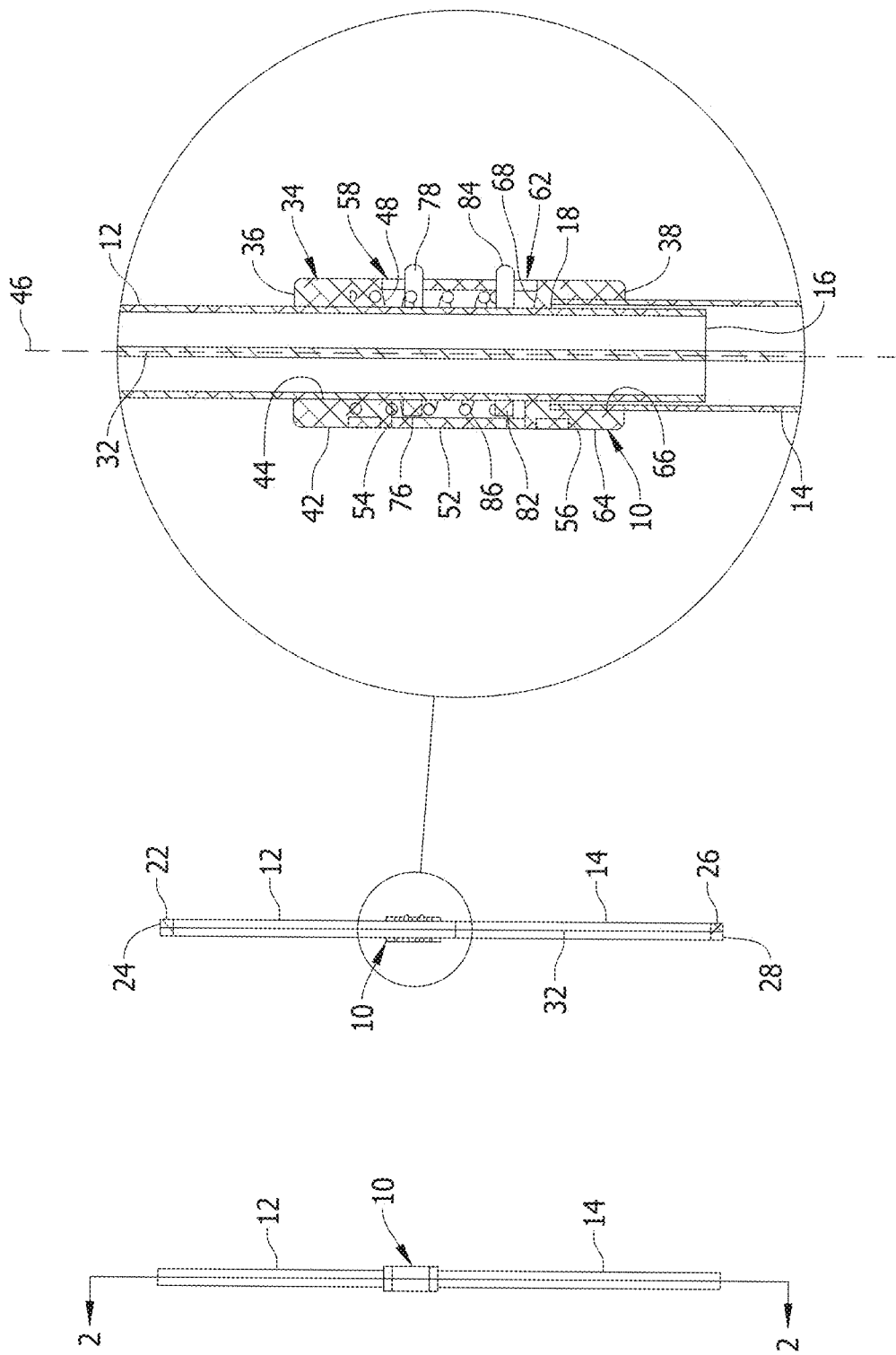
FIG. 1 is a representation of a front elevation view of the lock mechanism on a pair of telescopically adjustable length rods of this disclosure.
FIG. 2 is a representation of a cross-section view of the lock mechanism on the adjustable length rods in the plane of line 2-2 in FIG. 1.
FIG. 3 is an enlarged cross-section view of the circled portion of the lock mechanism and the adjustable length rods of FIG. 2.
Figure 4:
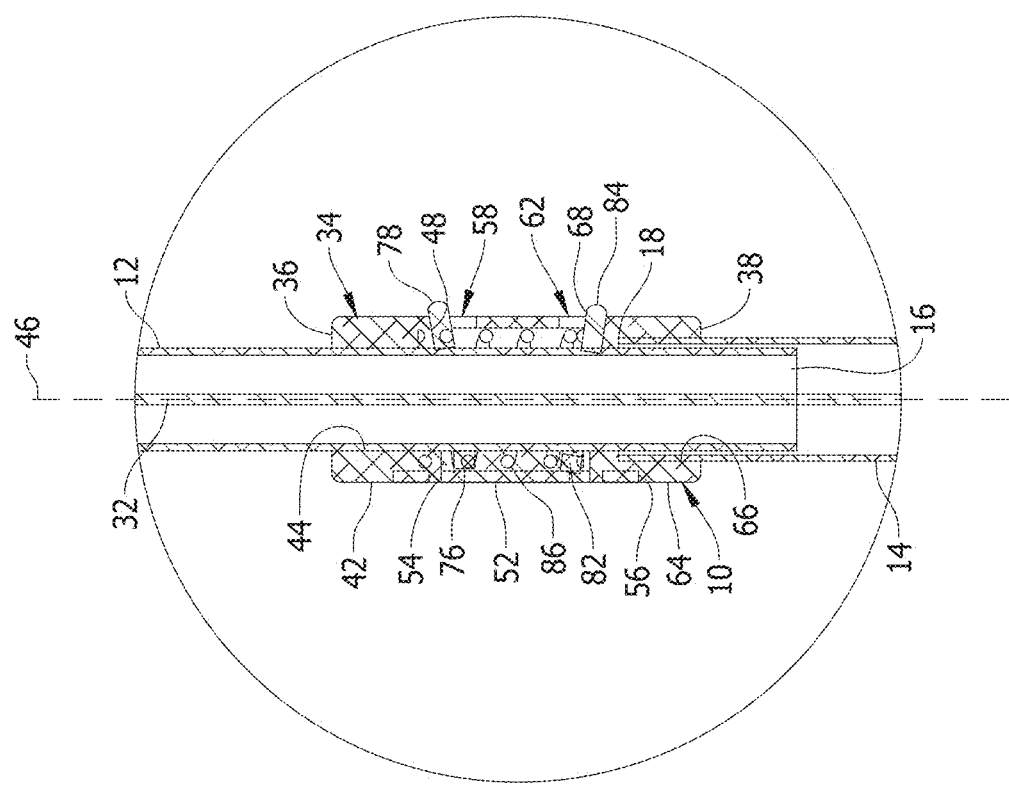
FIG. 4 is a view similar to FIG. 3 but showing the lock mechanism in a locked condition.

FIG. 1 is a representation of a front elevation view of a lock mechanism 10 that is operable to lock an adjusted length of an object of this disclosure. The lock mechanism 10 is similar to a locking mechanism 14 disclosed in U.S. Pat. Nos. 9,095,216 and 9,301,616, which are incorporated herein by reference. In FIG. 1 the object is a first rod 12 and a second rod 14 and the lock mechanism 10 is shown positioned on an adjustable length of a first rod 12 and a second rod 14. The first rod 12 is telescopically received in the second rod 14 and is dimensioned to slide into and out of the interior of the second rod 14, thereby adjusting the overall length of the first rod 12 and the second rod 14. The lock mechanism 10 is mounted stationary on the second rod 14 and can be operated to lock the first rod 12 in an adjusted position relative to the second rod 14.

In the environment of the lock mechanism 10 represented in FIG. 1 the lock mechanism 10 is fixed to an end of the second rod 14 and extends over the first rod 12 as the first rod 12 enters into the interior of the second rod 14. The lock mechanism 10 can be unlocked to enable an adjustment of the overall length of the first rod 12 and the second rod 14 by adjustably telescoping the first rod 12 into and out of the second rod 14. The lock mechanism 10 can then be locked to lock the first rod 12 to the second rod 14 in their adjusted positions.

The lock mechanism 10 and the first rod 12 and second rod 14 can be constructed of materials that provide the lock mechanism 10, the first rod 12 and the second rod 14 with sufficient structural strength to operate in their intended manner. For example, the lock mechanism 10, the first rod 12 and the second rod 14 could be constructed of metals, of plastics, of composite materials or other equivalent types of materials.

FIG. 2 is a representation of a cross-section view of the lock mechanism 10, the first rod 12 and the second rod 14 in a plane positioned along the line 2-2 of FIG. 1. As represented in FIG. 2, the first rod 12 and the second rod 14 are tubular rods with hollow interiors. The rods could have circular cross-section configurations, rectangular cross-section configurations or any shape of tubing. A proximal end 16 of the first rod 12 extends through the proximal end 18 of the second rod 14 and into the interior of the second rod 14. As represented in FIG. 2, there is a first plug 22 secured in the distal end 24 of the first rod 12 and a second plug 26 secured in the distal end 28 of the second rod 14. A cord 32 is secured between the first plug 22 and the second plug 26 and extends through the interiors of the first rod 12, the lock mechanism 10 and the second rod 14. The cord 32 connects the first rod 12 and the second rod 14 and prevents the rods from being pulled apart and separated from each other and separated from the lock mechanism 10.

FIG. 3 is an enlarged cross-section view of the lock mechanism 10 positioned at the connection of the first rod 12 and second rod 14 shown circled in FIG. 2. As represented in FIG. 3, the lock mechanism 10 has a cylindrical housing with an exterior surface configuration 34 that can be easily gripped by one hand of a user of the lock mechanism. The housing 34 has a length that extends between a first end surface 36 of the housing and a second end surface 38 of the housing. With the housing 34 having a general cylindrical configuration, the first end surface 36 and the second and surface 38 have general circular or annular configurations.

The housing comprises a first end cap 42. The first end cap 42 is positioned at the first end of the housing 34. The first end surface 36 is on the first end cap 42. The first end cap 42 has a first cylindrical interior surface 44 that surrounds and defines a first portion of an interior bore extending through the housing 34. The first cylindrical interior surface 44 extends around the interior bore and around a center axis 46 of the interior board. A first annular surface 48 is provided on the first end cap 42 on the opposite side of the first end cap from the first end surface 36. As represented in FIG. 3, the first annular surface 48 is positioned in a plane that is oriented at an angle relative to the center axis 46. The first annular surface 48 is a beveled surface relative to the center axis 46.

The housing also comprises a housing sleeve 52 attached to the first end cap 42. The housing sleeve 52 has a cylindrical configuration and a first end 54 that is attached to the first end cap 42. The housing sleeve 52 extends around the first annular surface 48 of the first end cap 42 and surrounds an intermediate portion of the interior bore of the housing 34. The housing sleeve 52 extends from the first end 54 of the sleeve axially to a second end 56 of the sleeve. A first slot 58 is formed in the first end 54 of the housing sleeve 52 and communicates the interior bore of the housing 34 with an exterior of the housing. A second slot 62 is also formed in the second end 56 of the housing sleeve and communicates the interior bore of the housing 34 with the exterior of the housing.

A second end cap 64 is positioned at the second end of the housing 34 and is attached to the second end 56 of the housing sleeve 52. The second end surface 38 is on the second end cap 64. The second end cap 64 has second cylindrical interior surface 66 that surrounds and defines a second end portion of the interior bore extending through the housing 34. The second cylindrical interior surface 66 extends around the interior bore and around the center axis 46 of the interior bore. A second annular surface 68 is provided on the second end cap 64 on an opposite side of the second end cap from the second end surface 38 of the housing 34. As represented in FIG. 3, the second annular surface 68 is positioned in a plane that is oriented at an angle relative to the center axis 46. The second annular surface 68 is a beveled surface relative to the center axis 46.

The proximal end 18 of the second rod 14 extends into the second end cap 64 from the second end surface 38 and is secured stationary to the second end cap 64. As represented in FIG. 3, the proximal end 18 of the second rod 14 is positioned adjacent the second annular surface 68 of the second end cap 64.

As represented in FIG. 2 and FIG. 3, a proximal end 16 of the first rod 12 extends into and through the first end cap 42 from the first end surface 36. The proximal end 16 of the first rod 12 is received in the first cylindrical interior surface 44 of the first end cap 42 for axially reciprocating movements through the interior surface 44. The proximal end 16 of the first rod 12 extends through the first end cap 42 and through the housing sleeve 52 and into the proximal end 18 of the second rod 14. The proximal end 16 of the first rod 12 is dimensioned for axially reciprocating movements through the first end cap 42, through the housing sleeve 52, through the second end cap 64 and through the proximal end 18 of the second rod 14 and through the second rod 14.

A first lock key having a ring portion 76 is positioned in the interior bore of the housing 34 with the ring portion 76 of the first lock key extending around the first rod 12. As represented in FIG. 3, the ring portion 76 of the first lock key is positioned adjacent the first annular surface 48 of the first end cap 42. The ring portion 76 is dimensioned so that the ring portion slides freely over the first rod 12 when the ring portion is positioned in a perpendicular orientation relative to the center axis 46 of the interior bore. When the ring portion 76 of the first lock key is positioned at an angle relative to the center axis 46, for example when the ring portion 76 engages against the first annular surface 48 of the first end cap 42, the ring portion 76 of the first lock key engages against opposite sides of the exterior surface of the first rod 12 and is secured stationary relative to the first rod. When the ring portion 76 of the first lock key then engages against the first annular surface 48, the ring portion 76 prevents movement of the first rod 12 relative to the first end cap 42 and relative to the housing 34 when the first rod 12 is pulled out of the lock mechanism 10 and the second rod 14. The first lock key also has a tab 78 the projects radially from the ring portion 76 and through the first slot 58 to the exterior of the housing 34 as represented in FIG. 3.

A second lock key having a ring portion 82 is positioned in the interior bore of the housing 34 with the ring portion 82 of the second lock key extending around the first rod 12. As represented in FIG. 3, the ring portion 82 of the second lock key is positioned adjacent the second annular surface 68 of the second end cap 64. The ring portion 82 of the second lock key is dimensioned so that the ring portion 82 slides freely over the first rod 12 when the ring portion 82 is positioned in a perpendicular orientation relative to the center axis 46 of the interior bore. When the ring portion 82 of the second lock key is positioned at an angle relative to the center axis 46, for example when the ring portion 82 engages against the second annular surface 68 of the second end cap 64, the ring portion 82 of the second lock key engages against opposite sides of the exterior surface of the first rod 12 and is secured stationary relative to the first rod. When the ring portion 82 of the second lock key then engages against the second annular surface 68, the ring portion prevents movement of the first rod 12 relative to the second end cap 64 and relative to the housing 34 when the first rod 12 is pushed into the lock mechanism 10 and the second rod 14. The second lock key also has a tab 84 that projects radially from the ring portion 82 and through the second slot 62 to the exterior of the housing 34.

A spring 86 is positioned in the interior bore between the ring portion 76 of the first lock key and the ring portion 82 of the second lock key. The spring 86 as represented in FIG. 3 is a coil spring, although other equivalent types of springs could be employed. The spring 86 is dimensioned to permit the first rod 12 to extend and reciprocate through the center of the spring as represented in FIG. 3. The spring 86 is also dimensioned to engage against the ring portion 76 of the first lock key and urge the ring portion into engagement against the first annular surface 48 of the first end cap 42 and to engage against the ring portion 82 of the second lock key and urge the ring portion into engagement against the second annular surface 68 of the second end the cap 64.

In operation of the lock mechanism 10 assembled on the first rod 12 and the second rod 14 as represented in FIGS. 1-3, a user first manually engages the tab 78 projecting from the ring portion 76 of the first lock key and the tab 84 projecting from the ring portion 82 of the second lock key and moves the tabs together or axially toward each other against the bias of the spring 86. This disengages the ring portion 76 of the first lock key from the first annular surface 48 of the first end cap 42 and positions the ring portion 76 in a perpendicular orientation relative to the center axis 46 and the first rod 12 as represented in FIG. 3. This also disengages the ring portion 82 of the second lock key from the second annular surface 68 of the second end cap 64 and positions the ring portion 82 in a perpendicular orientation relative to the center axis 46 and the first rod 12 as represented in FIG. 3. This enables the first rod 12 to be moved axially through the centers of the ring portion 76 of the first lock key and the ring portion 82 of the second lock key and adjustably position the first rod 12 telescopically relative to the second rod 14 and the lock mechanism 10.

When the first rod 12 and the second rod 14 are telescopically positioned to desired relative positions with the first rod 12 and the second rod 14 at a desired length, the user disengages their manual engagement with the tab 78 extending from the ring portion 76 of the first lock key and the tab 84 extending from the ring portion 82 of the second lock key. This enables the spring 86 to push the ring portion 76 of the first lock key axially toward and into engagement with the first annular surface 48 on the first end cap 42 and push the ring portion 82 of the second lock key axially toward and into engagement with the second annular surface 68 of the second end cap 64. The engagement of the ring portion 76 of a first lock key against the first annular surface 48 orients the ring portion 76 at an angle and in engagement with the exterior surface of the first rod 12. The engagement of the ring portion 82 of the second lock key against the second annular surface 68 orients the ring portion 82 at an angle and in engagement with the exterior surface of the first rod 12. The engagement of the ring portion 76 of the first lock key against the first rod 12 and the engagement of the ring portion 82 of the second lock key against the first rod 12 secures the lock keys to the first rod 12 and prevents further axial movement of the first rod 12 through the lock mechanism 10 and relative to the second rod 14. This secures the first rod 12 and the second rod 14 in their adjusted length positions.

To unlock the first rod 12 and the second rod 14 from their adjusted length positions, the user again engages the tab 78 extending from the ring portion 76 of the first lock key and the tab 84 extending from the ring portion 82 of the second lock key and urges the tabs together against the bias of the spring 86. This results in the ring portion 76 of the first lock key disengaging from the first rod 12 and the ring portion 82 of the second lock key disengaging from the first rod 12 and enables the first rod 12 to be moved axially through the first lock key and the second lock key and through the lock mechanism 10 and axially into or out of the second rod 14 to again adjustably position the first rod 12 relative to the second rod 14.

Figure 5:
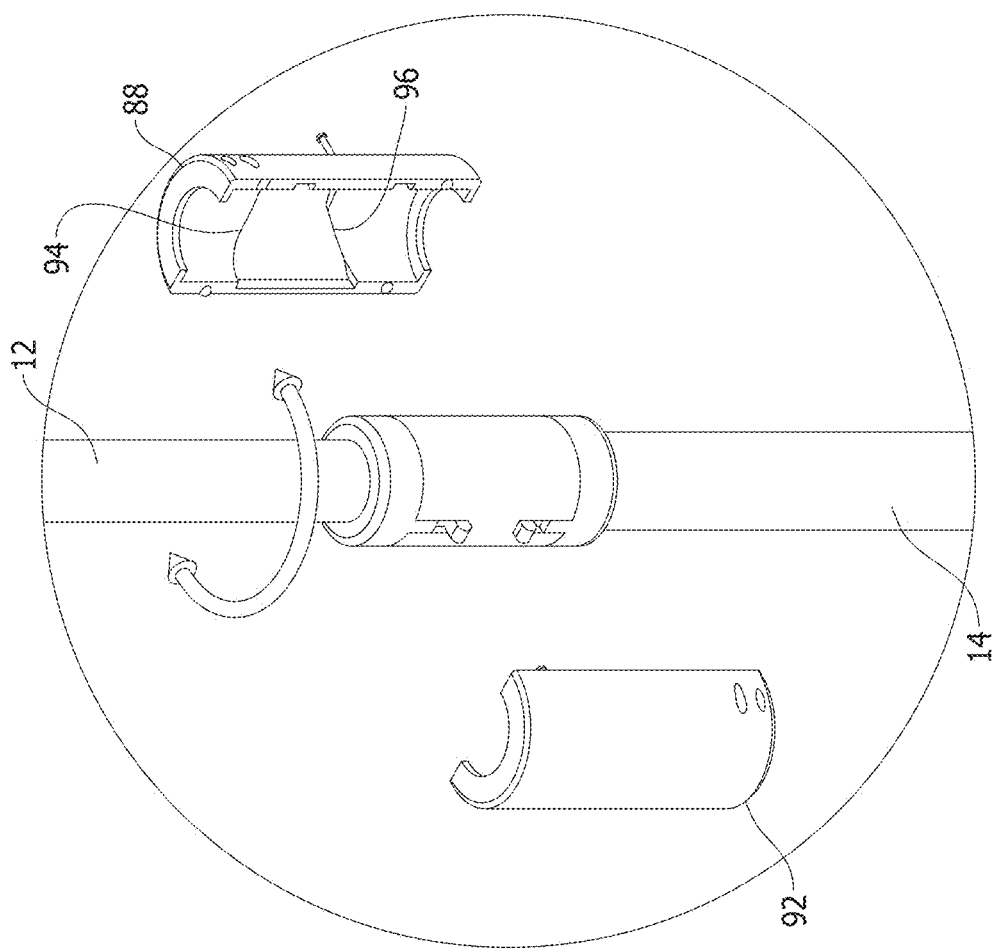
FIG. 5 is a perspective exterior view of the lock mechanism of FIG. 3 with a two-piece operator sleeve that is attachable over the housing of the lock mechanism.
Figure 6:
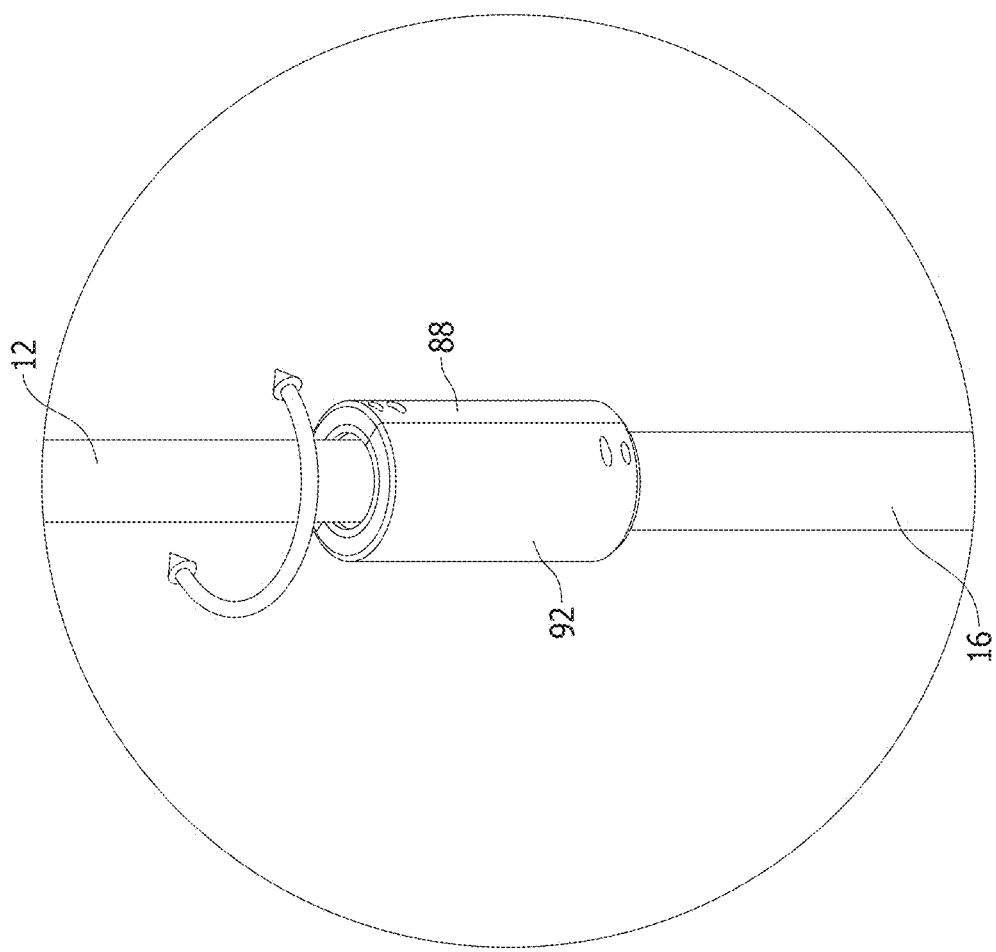
FIG. 6 is a perspective view of the operator sleeve assembled over the housing of the lock mechanism.

FIG. 5 is a representation of a two piece 88, 92 operator sleeve that can be assembled over the exterior of the housing 34 of the lock mechanism 10 and rotated about the center axis 46 around the housing. As represented in FIG. 5, a pair of grooves 94, 96 are formed in the interior surfaces of the two pieces 88, 92 of the operator sleeve. With the two pieces 88, 92 of the operator sleeve assembled on the housing 34 as represented in FIG. 6, the tab 78 projecting from the ring portion 76 of the first lock key engages in the upper groove 94 and the tab 84 projecting from the ring portion 82 of the second lock key engages in the lower groove 96. As represented in FIG. 5, the grooves 94, 96 separate from each other as the grooves extend around the two piece sleeve 88, 92 in a counterclockwise direction, and the grooves 94, 96 converge toward each other as the grooves extend around the two piece sleeve 88, 92 in a clockwise direction. Thus, with the two piece sleeve 88, 92 assembled on the housing 34 of the lock mechanism 10, manually rotating the operator sleeve in a counter-clockwise direction as viewed in FIG. 5 and FIG. 6 causes the grooves 94,96 to move the respective tabs 78, 84 toward each other and unlocks the lock mechanism 10 and enables the first rod 12 to be adjustably positioned relative to the second rod 14. Manually rotating the operator sleeve in the clockwise direction as viewed in FIG. 5 and FIG. 6 causes the grooves 94,96 to move the respective tabs 78,84 away from each other and locks the lock mechanism 10 and secures the first rod 12 and the second rod 14 in their adjusted positions.

Figure 7:
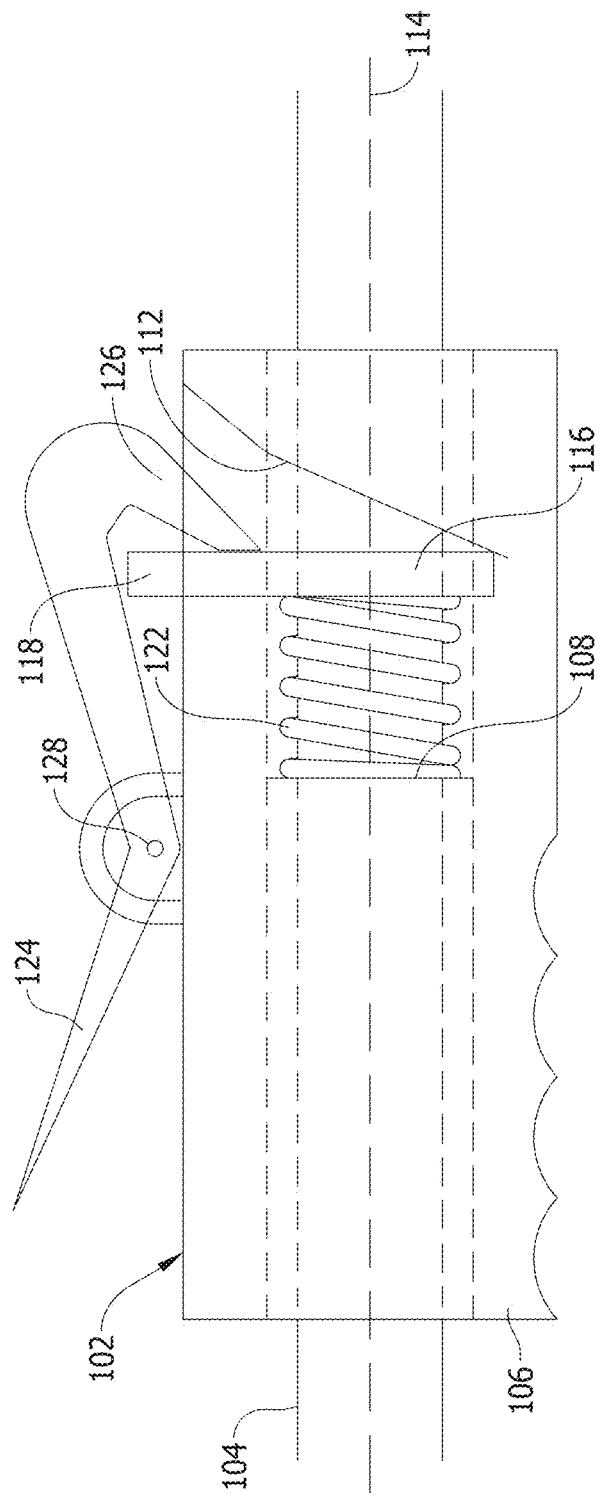
FIG. 7 is a representation of a variant embodiment of the lock mechanism on a flexible cord such as a rope with the lock mechanism in an unlocked condition.
Figure 8:
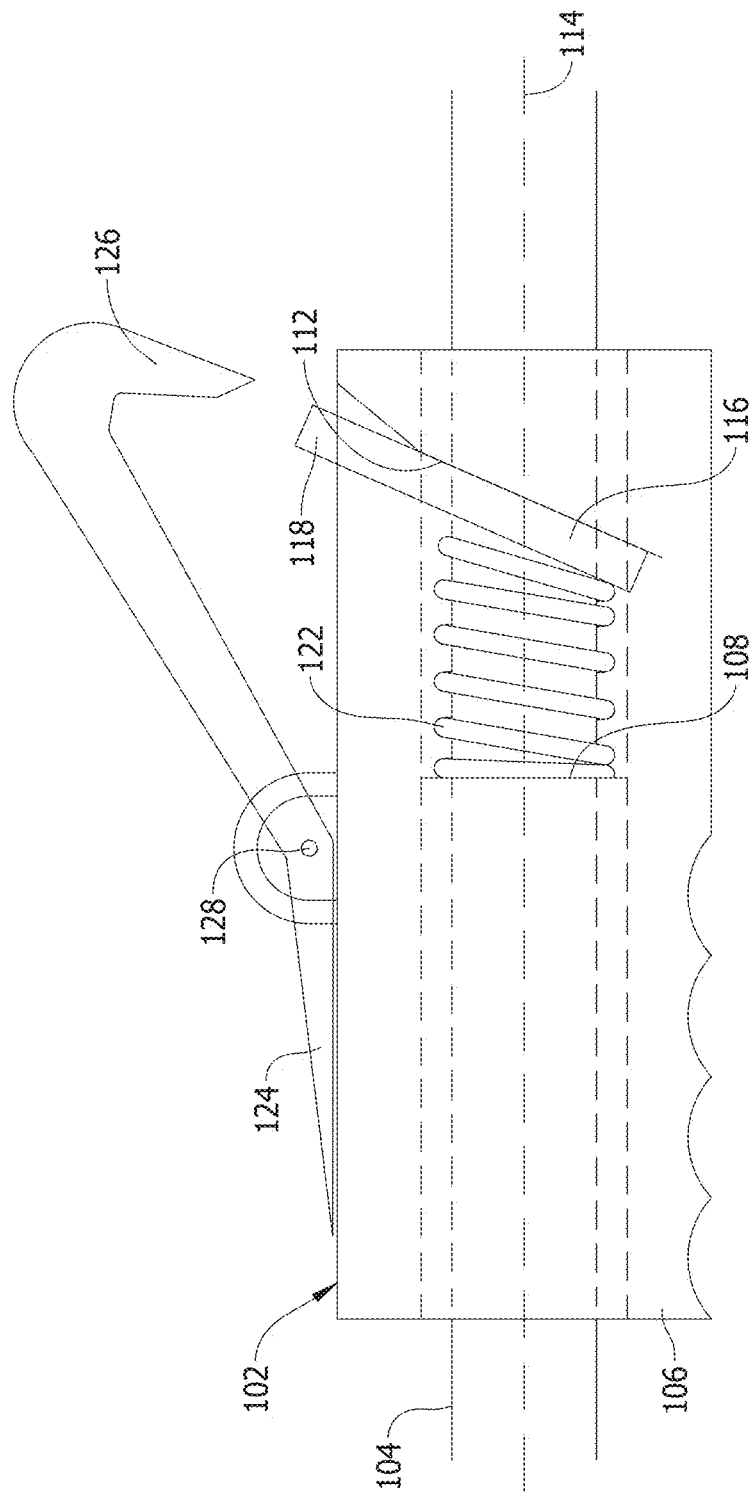
FIG. 8 is a representation of the lock mechanism of FIG. 7 in a locked condition.

In other applications, as represented in FIGS. 7 and 8, the lock mechanism 102 can be mounted on a length of an object and adjustably positioned along the length of the object. The lock mechanism 102 can then be operated to lock the lock mechanism 102 in an adjusted position of the lock mechanism on the length of the object. For example, the lock mechanism 102 can be mounted on the length of a flexible cable such as a rope 104 and adjustably positioned along the length of the rope.

As in the previously described example, the lock mechanism 102 comprises a housing 106 with an interior bore. A first annular surface 108 is at one end of the interior bore and a second annular surface 112 is at an opposite end of the interior bore. The first annular surface 108 is positioned in a plane that is oriented perpendicular to the center axis 114 of the interior bore. The second annular surface 112 is positioned in a plane that is oriented at an angle relative to the center axis 114 and is a beveled surface relative to the center axis. There is also an axial slot through the housing 106 communicating the interior bore with the exterior of the housing. The slot is adjacent to the second annular surface 112.

As with the previously described lock mechanism, there is a lock key having a ring portion 116 positioned in the interior bore of the housing 106. The lock key also has a tab 118 that projects radially from the ring portion 116 through the slot in the side of the housing 106 to the exterior of the housing. The rope 104 extends through the ring portion 116 of the lock key. As represented in FIG. 7 and FIG. 8, the ring portion 116 of the lock key is positioned adjacent to the second annular surface 112. The ring portion 116 of the lock key is dimensioned so that the ring portion 116 slides freely over the rope 104 when the ring portion 116 is positioned in a perpendicular orientation relative to the center axis 114 of the interior bore. When the ring portion 116 of the lock key is positioned at an angle relative to the center axis 114, for example when the ring portion 116 engages against the second annular surface 112, the ring portion 116 of the lock key engages against opposite sides of the exterior surface of the rope 104 and is secured stationary relative to the rope. When the ring portion 116 of the lock key then engages against the second annular surface 112, the ring portion 116 prevents movement of the rope 104 from left to right through the housing as viewed in FIG. 7 and FIG. 8. Thus, with the ring portion 116 positioned against the second annular surface 112 as represented in FIG. 8, the housing 106 of the lock mechanism 102 can be manually gripped and pulled from right to left as viewed in FIG. 7 and FIG. 8 and thereby pull the rope 104 from right to left.

A spring 122 is positioned in the interior bore between the ring portion 116 of the lock key and the first annular surface 108. The spring 122 is a coil spring that is dimensioned to enable the rope 104 to pass through the center of the spring as represented in FIG. 7 and FIG. 8. The spring 122 is also dimensioned to engage against the ring portion 116 of the lock key and urge the ring portion into engagement with the second annular surface 112.

A control handle 124 with a control hook 126 is mounted on the exterior of the housing 106 by a spring biased pivot connection 128. The spring biased pivot connection 128 biases the control hook 126 into engagement with the tab 118 projecting from the ring portion 116 of the lock key. Engagement of the control hook 126 with tab 118 moves the ring portion 116 against the bias of the spring 122 to the disengaged position of the ring portion 116 from the rope 104 as represented in FIG. 7. In the position of the ring portion 116 represented in FIG. 7, the rope 104 is free to move through the interior of the housing 106 and the housing 106 is free to be adjustably positioned over the length of the rope 104.

When the control handle 124 is manually pressed toward the housing 106, the control hook 126 moves against the bias of the spring biased pivot connection 128 to a disengaged position relative to the tab 118 projecting from the ring portion 116 as represented in FIG. 8. In the position of the control hook 126 shown in FIG. 8, the spring 122 biases the ring portion 116 into engagement with the second annular surface 112 which results in the ring portion 116 engaging against opposite sides of the rope 104. This secures the rope 104 to the lock mechanism 102 preventing the lock mechanism from being moved from right to left on the rope 104 as viewed in FIG. 7 and FIG. 8. In this position of the ring portion 116, the lock mechanism 102 can be used to manually pull the rope 104 from right to left as viewed in FIG. 7 and FIG. 8.

Thus, in the manner discussed above, the lock mechanism 102 is used as a hand hold on the rope 104 that can be adjustably positioned along the length of the rope 104 and then lock 2 the rope 104 to manually pull the rope.

As various modifications could be made in the construction of the lock mechanism of this disclosure and its method of operation herein described and illustrated without departing from the scope of the invention, it is intended that all matter contained in the foregoing description or shown in the accompanying drawings shall be interpreted as illustrative only rather than limiting. Thus, the breadth and scope of the present disclosure should not be limited by any of the above described exemplary embodiments, but should be defined only in accordance with the following claims appended hereto and their equivalents.

The invention claimed is:
1. A lock mechanism comprising:
a housing;
an interior bore extending through the housing, the interior bore having a center axis;
a first annular surface inside the housing, the first annular surface extending around the interior bore and around the center axis, the first annular surface is positioned in a plane that is oriented at an angle relative to the center axis and the first annular surface is a beveled surface relative to the center axis;
a second annular surface inside the housing, the second annular surface extending around the interior bore and around the center axis, the second annular surface is positioned in a plane that is oriented at an angle relative to the center axis and the second annular surface is a beveled surface relative to the center axis;

a lock key, the lock key having a ring portion inside the housing extending around the interior bore;

an object having a length extending through the interior bore and through the ring portion of the lock key; and the ring portion of the lock key being configured to be movable in the interior bore toward the first annular surface where when the ring portion engages in surface engagement around and against the first annular surface the ring portion is configured to engage against the length of the object extending through the interior bore and through the ring portion and prevent movement of the length of the object relative to the housing and the ring portion being configured to be movable in the interior bore away from the first annular surface where when the ring portion disengages from the first annular surface the ring portion is configured to disengage from the length of the object extending through the interior bore and through the ring portion and enable movement of the length of the object through the interior bore relative to the housing.

2. The lock mechanism of claim 1, further comprising:

an opening in the housing from the interior bore to an exterior of the housing; and the lock key having a tab portion extending from the ring portion and extending from the interior bore through the opening in the housing to the exterior of the housing.

3. The lock mechanism of claim 2, further comprising:

the tab portion of the lock key being configured to be manually movable at the exterior of the housing and to move the ring portion of the lock key in the interior bore of the housing toward and away from the first annular surface.

4. The lock mechanism of claim 2, further comprising:

an operator sleeve on the housing, the operator sleeve being rotatable on the housing, the operator sleeve having an interior surface surrounding the housing;

a groove in the interior surface of the operator sleeve;

the tab portion of the lock key extending from the ring portion and extending through the opening in the housing into the groove in the interior surface of the operator sleeve; and the groove in the interior surface of the operator sleeve being configured to move the tab portion of the lock key across the opening in the housing in response to rotation of the operator sleeve on the housing.

5. The lock mechanism of claim 1, further comprising:

the housing having a cylindrical interior surface extending around the interior bore, the cylindrical interior surface having a center axis that is coaxial with the center axis of the interior bore; and the first annular surface being a planar surface extending around the center axis of the housing and the interior bore and being positioned in a beveled plane relative to the center axis of the housing and the interior bore.

6. The lock mechanism of claim 5, further comprising:

the object is a rod having a rigid length extending through the interior bore and through the ring portion of the lock key.

7. The lock mechanism of claim 6, further comprising:

the rod is a first rod extending through the interior bore; and a second rod extends through the interior bore, the second rod is fixed to the housing.

8. The lock mechanism of claim 7, further comprising:

a cord is connected between the first rod and the second rod and prevents the first rod and the second rod from being separated from the housing.

9. The lock mechanism of claim 5, further comprising:

the second annular surface being a planar surface extending around the center axis of the housing and the interior bore and being positioned in a beveled plane relative to the center axis of the housing and the interior bore.

10. The lock mechanism of claim 9, further comprising:

the lock key is a first lock key; and a second lock key, the second lock key having a ring portion inside the housing and extending around the interior bore, the ring portion of the second lock key being configured to be movable in the interior bore toward the second annular surface where the ring portion of the second lock key engages in surface engagement around and against the second annular surface the ring portion of the second lock key engages against the length of the object extending through the interior bore and through the ring portion of the second lock key and prevents movement of the length of the object through the interior bore relative to the housing and the ring portion of the second lock key being configured to be movable in the interior bore away from the second annular surface where the ring portion of the second lock key disengages from the length of the object extending through the interior bore and through the ring portion of the second lock key and enables movement of the length of the object relative to the housing.

11. A lock mechanism comprising:

a housing, the housing having a length extending between a first end surface of the housing and a second end surface of the housing;

an interior bore extending through the housing from the first end surface of the housing to the second end surface of the housing, the interior bore having a center axis;

a first annular surface inside the housing, the first annular surface extending around the interior bore and around the center axis, the first annular surface is positioned in a plane that is oriented at an angle relative to the center axis and the first annular surface is a beveled surface relative to the center axis;

a second annular surface inside the housing, the second annular surface extending around the interior bore and around the center axis, the second annular surface is positioned in a plane that is oriented at an angle relative to the center axis and the second annular surface is a beveled surface relative to the center axis;

a lock key, the lock key having a ring portion inside the housing extending around the interior bore;

an object having a length extending through the interior bore and through the ring portion of the lock key;

a spring inside the housing between the first annular surface and the second annular surface, the spring engaging against the ring portion of the lock key and urging the lock key toward the first annular surface; and the ring portion of the lock key being configured to be movable in the interior bore by a force of the spring toward and into engagement with the first annular surface where the ring portion engages against the length of the object extending through the interior bore and through the ring portion and prevents movement of the length of the object relative to the housing and the ring portion being configured to be movable in the interior bore against the force of the spring away from the first annular surface where the ring portion disengages from the length of the object extending through the interior bore and through the ring portion and enables movement of the length of the object relative to the housing.

12. The lock mechanism of claim 11, further comprising:
an opening in the housing from the interior bore to an exterior of the housing; and
the lock key having a tab portion extending from the ring portion and the interior bore through the opening in the housing to the exterior of the housing.

13. The lock mechanism of claim 12, further comprising:
the tab portion of the lock key being configured to be manually movable at the exterior of the housing and to move the ring portion of the lock key in the interior bore of the housing toward and away from the first annular surface.

14. The lock mechanism of claim 13, further comprising:
the housing having a cylindrical interior surface extending around the interior bore, the cylindrical interior surface having a center axis that is coaxial with the center axis of the interior bore; and
the first annular surface being a planar surface extending around the center axis of the housing and the interior bore and being positioned in a beveled plane relative to the center axis of the housing and the interior bore.

15. The lock mechanism of claim 14, further comprising:
the object is a rod having a length extending through the interior bore and through the ring portion of the lock key.

16. The lock mechanism of claim 15, further comprising:
the rod is a first rod extending through the first end surface of the housing and through the interior bore; and
a second rod extends through the second end surface of the housing and into the interior bore, the second rod is fixed to the housing.

17. The lock mechanism of claim 16, further comprising:
a cord is connected between the first rod and the second rod and prevents the first rod and the second rod from being separated from the housing.

18. The lock mechanism of claim 14, further comprising:
the second annular surface being a planar surface extending around the center axis of the housing and the interior bore and being positioned in a beveled plane relative to the center axis of the housing and the interior bore.

19. The lock mechanism of claim 18, further comprising:
the lock key is a first lock key; and
a second lock key, the second lock key having a ring portion inside the housing and extending around the interior bore, the ring portion of the second lock key being configured to be movable in the interior bore by a force of the spring toward the second angular surface where the ring portion of the second lock key engages in surface engagement around and against the length of the object extending through the interior bore and through the ring portion of the second lock key and prevents movement of the length of the object relative to the housing and the ring portion of the second lock key being configured to be movable in the interior bore against the force of the spring away from the second annular surface where the ring portion of the second lock key disengages from the length of the object extending through the interior bore and through the ring portion of the second lock key and enables movement of the length of the object relative to the housing.

20. The lock mechanism of claim 12, further comprising:
an operator sleeve on the housing, the operator sleeve being rotatable on the housing, the operator sleeve having an interior surface surrounding the housing;
a groove in the interior surface of the operator sleeve;
the tab portion of the lock key extending from the ring portion and extending through the opening in the housing into the groove in the interior surface of the operator sleeve; and
the groove in the interior surface of the operator sleeve being configured to move the tab portion of the lock key across the opening in the housing in response to rotation of the operator sleeve on the housing.

* * * * *